United States Patent
Kilchrist et al.

(10) Patent No.: US 7,297,663 B1
(45) Date of Patent: Nov. 20, 2007

(54) METHOD OF DECREASING LOST CIRCULATION DURING WELL OPERATIONS AND ADDITIVE THEREFOR

(75) Inventors: Michael J. Kilchrist, Lafayette, LA (US); Robin J. Verret, Youngsville, LA (US)

(73) Assignee: Turbo-Chem International, Inc., Scott, LA (US)

( * ) Notice: Subject to any disclaimer, the term of this patent is extended or adjusted under 35 U.S.C. 154(b) by 256 days.

(21) Appl. No.: 11/092,085

(22) Filed: Mar. 29, 2005

Related U.S. Application Data

(63) Continuation-in-part of application No. 10/248,597, filed on Jan. 30, 2003, now Pat. No. 6,976,537.

(60) Provisional application No. 60/319,106, filed on Jan. 30, 2002.

(51) Int. Cl.
*C09K 8/00* (2006.01)

(52) U.S. Cl. ............ 507/204; 507/269; 166/294; 175/72

(58) Field of Classification Search ............ 507/104
See application file for complete search history.

(56) References Cited

U.S. PATENT DOCUMENTS

| | | | | |
|---|---|---|---|---|
| 4,369,844 A | * | 1/1983 | Clear | 166/294 |
| 5,147,852 A | * | 9/1992 | Cowan et al. | 507/104 |
| 6,016,879 A | * | 1/2000 | Burts, Jr. | 175/72 |
| 2002/0128158 A1 | * | 9/2002 | Green | 507/104 |

* cited by examiner

*Primary Examiner*—David J. Buttner
(74) *Attorney, Agent, or Firm*—Daniel N. Lundeen; Lundeen & Dickinson, LLP

(57) ABSTRACT

The invention discloses an additive for weighted aqueous slurries to reduce lost circulation during well drilling operations, a method of preparing the additive, and a method of reducing lost circulation utilizing the additive. The additive comprises a hardenable alkaline composition comprising mixtures of diatomaceous earth, finely ground paper, a hydrophobic liquid, micronized cellulose and lime. The hydrophobic liquid decreases the time required to prepare the weighted aqueous slurries, i.e., pills, containing the additive.

15 Claims, No Drawings

METHOD OF DECREASING LOST CIRCULATION DURING WELL OPERATIONS AND ADDITIVE THEREFOR

This application is a continuation-in-part of application Ser. No. 10/248,597 filed Jan. 30, 2003 now U.S. Pat. No. 6,976,537 which claims priority to provisional application Ser. No. 60/319,106 filed Jan. 30, 2002.

BACKGROUND OF THE INVENTION

The invention relates to an improved composition and method for reducing lost circulation when aqueous or oil base drilling fluids are used.

During oil and gas well drilling operations, it is well known that subterranean formation conditions may be encountered in which substantial amounts, and indeed all, of the drilling fluid may be lost to the formation. This is known in the art as "lost circulation." In order to overcome the lost circulation, many different materials, known as lost circulation materials/additives, have been added to the drilling fluid to regain full circulation of the drilling fluid.

There is disclosed in co-pending U.S. patent application Ser. No. 10/248,597 filed Jan. 30, 2003, incorporated herein by reference, a method of reducing lost circulation which includes placement of an acidic gellable composition slurry into the location of the wellbore where lost circulation is occurring (the "lost circulation zone", "thief zone", etc.) and thereafter contacting the acidic gellable composition slurry with a hardenable alkaline composition slurry whereby the pH of the acidic gellable composition slurry is increased to the extent that the acidic gellable composition slurry is gelled.

The hardenable alkaline composition is a mixture of finely ground paper, diatomaceous earth, micronized cellulose, lime, and optionally but preferably sodium silicate and/or a water soluble sulfate.

This method of overcoming lost circulation has been very successful. However, it has been observed that the mixing time when preparing weighted hardenable alkaline composition slurries is excessive.

SUMMARY OF THE INVENTION

The present invention provides in one embodiment a method for treating the hardenable alkaline composition (hereinafter sometimes referred to as "HAC") discussed hereinbefore such that the mixing time is decreased when preparing weighted slurries of the hardenable alkaline composition for use in overcoming lost circulation during drilling operations. The method comprises mixing a hydrophobic liquid with the hardenable alkaline composition.

The invention also provides in one embodiment a modified hardenable alkaline composition for use in preparing weighted slurries for reducing lost circulation.

Thus the invention can provide a method of preparing a weighted slurry of a hardenable alkaline composition for lost circulation control during drilling operations comprising mixing a hydrophobic liquid with the hardenable alkaline composition, mixing the modified hardenable alkaline composition in an aqueous liquid, and thereafter mixing a weight material therewith.

In another embodiment the invention can provide an improved hardenable alkaline composition for use in preparing weighted slurries of the hardenable alkaline composition which can comprise a hardenable alkaline composition and a hydrophobic oil.

Other purposes, distinction over the art, advantages and features of this invention will be apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

As indicated, the invention comprises an improved hardenable alkaline composition for preparing weighted aqueous slurries to reduce lost circulation in oil and gas well drilling fluids and to a method of preparing such weighted aqueous slurries.

The improved hardenable alkaline composition can comprise a mixture of finely divided paper, a hydrophobic liquid, diatomaceous earth, lime, micronized cellulose, and optionally alkali metal silicate and/or alkali metal sulfate.

The finely divided paper can be in any form effective to act as a suspending agent for the HAC in aqueous slurries, for example, finely shredded paper, ground paper, and the like. Particularly satisfactory results have been obtained using finely divided paper. Such paper is available, for example, from Buckeye Mud Corporation, Midland, Tex., in fifty-pound sacks. However, any suitable paper for suspending the diatomaceous earth, for example, ground paper from such as newspapers, can be employed in accordance with the instant invention. The amount of paper employed is an amount effective to adequately suspend the other lost circulation materials (LCM), for example, diatomaceous earth, lime, micronized cellulose, and the like and other materials such as weighting materials, for example, barite and the like. Preferably, the amount of paper employed to stabilize the slurry is at least 2 percent by weight of the composition of the HAC. Broadly, the amount of paper can range from about 2.0 percent by weight to about 30 percent by weight. A preferred range is from about 3.5 to about 15.5 percent by weight, more preferably from about 4.5 to about 13 percent by weight. A more preferred level is about 9.5 to about 13 percent paper by weight to provide excellent suspending activity for the diatomite, micronized cellulose and weight material without unduly increasing the viscosity or unduly restricting water loss.

Diatomaceous earth, also known as diatomite, infusorial earth, or kieselguhr, is composed of the silicaceous skeletons of diatoms. Diatomaceous earth is abundantly available and relatively inexpensive and is known in the art as a fluid permeable filter cake forming formation-sealing agent. The diatomaceous earth can function as a high fines solid to assist in forming a permanent seal of permeable formations. The amount of diatomaceous earth employed in the HAC preferably comprises at least 22.5 percent by weight of said composition and more preferably is in the range from about 22.5 weight percent to about 50 weight percent. An especially preferred level is from about 24 percent to about 35 percent by weight.

The HAC also includes lime (calcium hydroxide). The lime is believed to react with the diatomaceous earth and with the sodium silicate, if present, to form calcium silicate and the sulfate, if present, to form calcium sulfate. Preferably, the lime can range from about 9 to about 50 weight percent. More preferably the amount of lime can range from about 22.5 to about 38 weight percent, and most preferably from about 24 to about 35 percent by weight of the mixture.

The HAC also includes a lost circulation material such as micronized cellulose fiber, e.g. ground wood such as that commercially available under the trade designation PRE-MIUM SEAL® coarse or fine ground wood. The micronized cellulose fiber preferably is present in the HAC mixture at from 9 to 40 weight percent, more preferably from 13.5 to 35 weight percent, and especially from 16 to 30 weight percent of the mixture. Other micronized fibers, preferably finely ground plant materials or parts thereof, can also be used as the lost circulation material. Many different types of materials can be used to provide the micronized fibers including natural and synthetic organic fibers, glass fibers, carbon fibers, inorganic fibers, rock wool fibers, metal fibers, and mixtures thereof. The fibers can be of a variety of shapes ranging from simple round or ovals to fibers having complex trilobed, figure eight, star shaped, or rectangular cross-sections. Curved, crimped, spiral shaped and other three dimensional fiber geometries may be used as well.

Preferably the micronized fiber is micronized cellulose obtained from cotton, plant materials, and other natural sources of cellulose.

The HAC also may include sodium silicate, preferably in the range of about 0.5 to about 5 percent by weight. The sodium silicate can occur naturally in the diatomaceous earth, however, if the diatomaceous earth does not contain sufficient amounts of sodium silicate or if additional sodium silicate is desired, it can be supplemented by amendment to the appropriate level.

The HAC also may include sulfate, preferably ranging from about 0.5 to about 5 percent by weight. Sulfate can be added separately in the form of sodium sulfate, for example, or can be added with a lost circulation material or as a naturally occurring constituent of the micronized cellulose fiber.

The HAC contains a hydrophobic liquid which can enable aqueous slurries of the HAC to more readily mix with weight material added to prepare the weighted HAC slurry. Any hydrophobic liquid which is non-reactive with the lime present in the HAC may be used. Preferably the hydrophobic liquid is a hydrocarbon such as the known hydrocarbons used in drilling and well servicing fluids, such as paraffins, olefins (alpha olefins, internal olefins), polymeric hydrocarbons, petroleum oils and fractions thereof (diesel oil, mineral oils, hydrogenated oils, etc., preferably low aromatic content oils). Preferably the amount of the hydrophobic liquid is from about 25% to about 100% by weight of the finely ground paper in the HAC, more preferably from about 30% to about 90% by weight of the finely ground paper, and most preferably from about 40% to about 75% by weight of the finely ground paper. Thus the HAC can contain from about 0.5 to about 30% by weight of the hydrophobic liquid, preferably from about 0.9 to about 15.5% by weight, more preferably from about 1.25 to about 14% by weight, most preferably from about 2.4% to about 12.75% by weight.

The HAC can be prepared by proportioning materials including finely divided paper, hydrophobic liquid, diatomaceous earth, lime, micronized cellulose fiber, sodium silicate (if added separately) and sulfate (if added separately) by weight in accordance with the above description of the composition of matter, and mixing the thus proportioned materials to form a generally homogeneous mixture. Preferably the hydrophobic oil is first mixed with the finely divided paper before adding and mixing the remaining components together to provide the HAC.

The base aqueous fluid for the HAC slurries (i.e., "pills", "slugs", etc. as they are variously called in the art) may be either fresh water, salt water, or sea water, or from any other water source. The HAC is also effective in reducing lost circulation when a non-aqueous liquid, i.e., a hydrocarbon, is used to prepare the weighted HAC slurry.

As is known, the density of a drilling fluid is an important parameter. To prevent blowout, the uncontrolled flow of fluids from the formation into the well, the drilling fluid must have a density effective to provide a greater pressure than that exerted by the formation fluids. However, densities must not be too high, because excessive hydrostatic pressures can cause further loss of circulation. Weighting materials to increase the density of drilling fluids are frequently added to such fluids, for example, ground barite, the widespread and common form of barium sulfate and the like can be used. Accordingly, the weighted slurries of the HAC further comprise a weighting material such as ground barite and the like added to adjust the density of the HAC slurries to a desired level.

If desired, conventional bridging materials can be added to the weighted HAC slurries. In general, formation-sealing agents may be classified either as surface plugging, interstitial bridging, or a combination of plugging and bridging. Various formation-sealing agents have heretofore been used in the art to form formation seals and/or filter cakes on the wall of a wellbore. These include sugar cane fibers or bagasse, flax, straw, ground hemp, cellophane strips, ground plastics, mica flakes, expended perlite, silica slag, ground fir bark, ground redwood bark and fibers, grape extraction residue, cottonseed hulls, cotton bolls, ginned cotton fibers, cotton linters, and the like. If fluid absorbent lost circulation materials are used, the viscosity of the weighted HAC slurries will increase. The slurry is effective without additional conventional lost circulation materials.

The HAC can be mixed with the base fluid and with the weighting material prior to use to obtain the desired weighted HAC slurry. One example of the HAC is commercially available from Turbo-Chem International, Inc., Lafayette, La., under the trademark EZ SQUEEZE®. The HAC can be mixed according to Tables A and B.

TABLE A

Formula for Mixing One Barrel of HAC (EZ SQUEEZE ®) Slurry in Fresh or Sea Water

| Density, | EZ Squeeze ®, | | Barite, | Water, |
|---|---|---|---|---|
| lb/gal | lb | sacks | sacks | bbl |
| 10 | 100 | 4.00 | 0.6 | 0.72 |
| 11 | 94 | 3.75 | 1.2 | 0.70 |
| 12 | 84 | 3.25 | 1.8 | 0.67 |
| 13 | 78 | 3.15 | 2.3 | 0.65 |
| 14 | 70 | 2.75 | 2.9 | 0.63 |
| 15** | 62 | 2.50 | 3.5 | 0.60 |
| 16 | 56 | 2.25 | 4.0 | 0.58 |
| 17 | 50 | 2.00 | 4.6 | 0.56 |
| 18 | 44 | 1.75 | 5.2 | 0.53 |
| 19 | 34 | 1.25 | 5.8 | 0.51 |

*If saturated salt water is used, barite must be decreased by 0.6 sacks per barrel.
**For squeeze pills equal to or greater than 15.0 ppg, use EZ Thin™ surfactant @ 5 gallon per 8 bbl of slurry.

Add 1-2 pails defoamer to mix water before adding any EZ Squeeze®. All EZ Squeeze® must be mixed prior to adding barite.

TABLE B

Formula for Preparing One Barrel of HAC (EZ SQUEEZE ®) Slurry with Hydrocarbon* or Synthetic Organic Liquid*

| Density, lb/gal | EZ Squeeze ®, lb | EZ Squeeze ®, sacks | Barite, sacks | Oil/Syn**, bbl |
|---|---|---|---|---|
| 8  | 88 | 3.50 | 0.38 | 0.616 |
| 9  | 82 | 3.25 | 0.88 | 0.599 |
| 10 | 75 | 3.00 | 1.38 | 0.581 |
| 11 | 70 | 2.75 | 1.88 | 0.564 |
| 12 | 64 | 2.60 | 2.38 | 0.539 |
| 13 | 60 | 2.40 | 2.90 | 0.522 |
| 14 | 54 | 2.20 | 3.43 | 0.504 |
| 15 | 48 | 1.90 | 3.97 | 0.487 |
| 16 | 44 | 1.75 | 4.52 | 0.469 |
| 17 | 38 | 1.50 | 5.08 | 0.458 |
| 18 | 32 | 1.25 | 5.65 | 0.427 |

*Due to variations in oil or synthetic and barite, pilot tests should be made to determine exact formulations. If slurry becomes too thick, add up to 1 lb/bbl wetting agent to thin.

The slurry can be mixed in a clean, uncontaminated mud pit and pumped with rig pumps. Typically the operator mixes twice the open hole volume, or a minimum of 100 bbl of weighted HAC slurry for longer open hole intervals. Ideally, enough slurry should be available to cover all potential loss zones, as well as enough excess volume available for squeezing operations.

Preparing the weighted HAC slurry begins with approximately 80 percent of the desired volume of fluid (oil/synthetic or water as per Table A or B above). To the fluid, the operator adds the required amount of HAC and 5 gallons of defoamer (when using water); then barite, and the remainder of the fluid. The operator follows this with additional LCM as required or desired. Generally, the weighted slurry should have about the same density as the drilling mud in use. Some additional LCM (for example, Premium Seal® Coarse, available form Turbo-Chem) in the slurry will often be beneficial. Premium Seal® Coarse is a deformable and compressible micronized cellulose fiber which is compatible with water, oil, and synthetic based muds and has been specially designed to seal permeable formations. The optimum particle size distribution (PSD) of graded fibrous particles creates a bridging action within a fraction of an inch in the borehole and a matting effect within the mud wall cake. From 5-20 pounds per barrel total LCM can be added depending upon conditions. The weighted HAC slurry can be pumped through the bit, but excessive concentrations of LCM should be avoided, and the LCM should be smaller than the nozzle sizes to avoid plugging. The operator should always test the slurry, to insure high fluid loss, prior to pumping. For water-based slurries, an API filter press pressured to 100 psi should de-water in approximately 1 minute. For oil-based slurries, an HTHP filtration cell heated to 150° F., and pressured to 200 psi (or the metric equivalent) should de-oil in 1.5 minutes.

No special equipment is needed to pump the weighted HAC slurry. The operator places the bottom of the drill pipe or bit at a depth that will allow an equivalent of the calculated open-hole volume to remain inside the casing above the casing shoe. The weighted HAC slurry is pumped at 2 bbl/min (bpm) until it reaches the end of the pipe. Before beginning the hesitation squeeze, the annulus is checked. If no fluid can be seen, the fill-up line is used to fill the hole.

The operator then closes the annular BOP (blowout preventer), and pumps the slurry at 1 bpm, for example. This directs the weighted HAC slurry down hole to the point of loss. The operator can pump one full open hole volume, plus an additional 20-30 bbl, leaving the remainder of the slurry in the casing. Pumping is then begun again at a low rate, e.g., 0.25 to 0.5 bpm. When an incremental pressure increase can be maintained, then progressively higher pressures are attempted, for example, in 25-50 psi increments. With this hesitation squeeze method, there will usually be a pressure bleed off each time the pump is stopped. With each successive squeeze, the pressure should stabilize at a higher level. A 200-600 psi squeeze is generally considered to be very good, however, squeeze pressure should desirably not exceed the maximum required fluid density needed in this hole interval. When maximum holding pressure is obtained, the well is preferably shut down for a sufficient time for the lost circulation zone to be sealed, typically about 4 hours.

Then the operator can bleed the pressure from the annulus slowly, and circulate any water and/or remaining weighted HAC slurry out of the hole. The drill pipe is staged back into the hole slowly, monitoring the weight indicator checking for bridges. The operator washes to bottom drilling any HAC plug encountered. The weighted HAC slurry will not set-up as hard as cement, so there is little likelihood of sidetracking the hole. Any remaining weighted HAC slurry may be incorporated into the drilling fluid.

The following examples will further illustrate the novel lost circulation additive and invention method of the present invention. The examples are given by way of illustration and not as a limitation of a scope of the invention. Thus, it should be clearly understood that the invention additive and method may be varied to achieve similar results within the scope of the invention.

EXAMPLE 1

A fourteen ppg standard HAC (EZ SQUEEZE®) slurry (Slurry A) was prepared by mixing 70 grams of EZ SQUEEZE® with 220 milliliters of water followed by 290 grams of barite for 5 minutes.

A fourteen ppg slurry (Slurry B) was similarly prepared using EZ SQUEEZE® which had been pre-mixed with a mineral oil in an amount of 50% by weight of the weight of the paper in the EZ SQUEEZE®.

Each slurry was placed in an API RP13(b) high pressure filtration apparatus and held for 5 minutes at 1000 psi to squeeze water from the slurry which was recovered and measured. The amount of water recovered from Slurry A was 140 ml. The amount of water recovered from Slurry B was 162 ml. Thus the increase in free water in Slurry B was 15.7% ((162−140)÷140)(100).

The increase in free water indicates that more water is available to wet the barite weight material thus decreasing the time required to mix the barite with the HAC slurry.

EXAMPLE 2

The re-formulated EZ SQUEEZE® containing a mineral oil in the amount of 50% by weight of the weight of the paper in the EZ SQUEEZE® was sent to a drilling rig in the Gulf of Mexico. A 100 barrel (42 gallons/barrel) slurry weighted to 16.3 ppg with barite was mixed in sea water with the existing rig equipment. The slurry was mixed in two 55 barrel batches to ensure that 100 pumpable barrels of slurry was available. Previous EZ SQUEEZE® slurries with this rig equipment at this density usually took between 3 to 4 hours for a 55 barrel batch. With the re-formulated EZ SQUEEZE®, the entire 100 barrels was mixed and placed in the drill pipe for pump down in less than 2.5 hours. Thus the HAC treated with the hydrocarbon oil resulted in a 3.5-5.5 hour reduction in rig time or a time savings of about 60%.

Prior to preparing the HAC of this invention containing the mineral oil, mixing time was a complaint on nearly every weighted slurry mixed. Not a single complaint of the mixing time has been lodged in over 13 lost circulation control squeeze jobs since the HAC of this invention containing the mineral oil was introduced to the drilling industry.

EXAMPLE 3-7

Mixtures suitable for preparing the weighted HAC slurries of this invention are prepared by blending together diatomaceous earth containing a small amount of naturally occurring sodium silicate at less than about 1 weight percent, lime, fine grind paper, mineral oil, and ground wood containing a small amount of naturally occurring sulfate at less than 1 weight percent, according to the following proportions in Table 1.

TABLE 1

Weight Percentages for Hardenable Alkaline Compositions

| Composition | Example 3 | Example 4 | Example 5 | Example 6 | Example 7 |
|---|---|---|---|---|---|
| Diatomaceous Earth | 38.1 | 34.3 | 32.0 | 30.7 | 29.1 |
| Lime | 23.8 | 27.8 | 32.0 | 30.7 | 36.8 |
| Fine Grind Paper | 4.75 | 7.4 | 11.3 | 9.3 | 7.75 |
| Micronized Cellulose | 28.6 | 23.1 | 18.9 | 22.3 | 23.25 |
| Mineral Oil | 4.75 | 7.4 | 5.8 | 7.0 | 3.1 |

EXAMPLE 8

While drilling at 16,379 feet with a mud weight of 16.9 ppg complete returns are lost. A conventional 100 bbl lost circulation pill is pumped without success. A 50 bbl lost circulation pill is prepared by mixing together 33 bbl fresh water, 10 ppb of SwelLCM™ gelling, swelling sealing agent, 1 ppb sulfamic acid, 5 gallons of a liquid defoamer, and 23,900 pounds of barite. With the bit at the shoe, this lost circulation pill is pumped to the bit followed by 75 bbl of a 16.9 ppg pill containing 50 ppb of the HAC of Example 5. The well is shut in and all 50 bbl of the SwelLCM™ pill and 35 bbl of the Example 5 HAC pill are pumped into the formation with an ending casing pressure of 500 psi. While holding pressure on the well for 3.5 hours, the casing pressure increases to 925 psi. Drilling resumed without further losses.

EXAMPLE 9

While drilling at 11,500 feet with a mud weight of 16.5 ppg complete returns were lost. A conventional 100 bbl lost circulation pill was pumped without success. A 180 bbl lost circulation pill was prepared by mixing together 100 bbl fresh water, 53 ppb of EZ Squeeze™ hardenable alkaline composition of this invention, 10 gallons of a liquid defoamer, and 77,400 pounds of barite. With the bit at the shoe, this lost circulation pill was pumped to the bit. The well was shut in and the HAC pill was pumped into the formation with a beginning casing pressure of 220 psi and with an ending casing pressure of the maximum necessary pressure 525 psi after only 7 bbl. The pressure was held for 4 hours. After the $1^{st}$ hour the drill pipe was rotated with the well shut in, pressure dropped from 520 psi to 467 psi; $2^{nd}$ hour fell to 391 psi; $3^{rd}$ hour fell to 388 psi; $4^{th}$ hour fell to 367 psi. The pressure was bled off, the well was opened, and circulation began. Drilling resumed without further losses.

EXAMPLE 10

While going back into the well a bridge was encountered at 12,650 feet. While washing and reaming through the bridge with a mud weight of 16.9 ppg complete returns were lost at 12,832 feet. The drill bit was pulled up to 12,350 feet and a conventional lost circulation pill was pumped without success. Continued pulling the bit out of the well to 11,817' and still could not circulate. A 100 bbl lost circulation pill was prepared by mixing together 56 bbl fresh water, 50 ppb EZ Squeeze™ hardenable alkaline composition of this invention, 10 gallons of a liquid defoamer, and 46,000 pounds of barite. With the bit at the shoe, this lost circulation pill was pumped out of the bit and up into the casing annulus. Twenty-two stands of drill pipe (±2,050') were used to place the bit above the HAC pill. The well was shut in, and after 50 bbl of the HAC pill was pumped into the formation, an ending casing pressure of the maximum necessary pressure 650 psi was achieved. The pressure was held for 4 hours. After the $1^{st}$ hour the drill pipe pressure dropped from 650 psi to 540 psi; $2^{nd}$ hour fell to 500 psi; $3^{rd}$ hour fell to 490 psi; $4^{th}$ hour fell to 480 psi. The pressure was bled off, the well was opened, and circulation begun. The well was logged without further losses.

What is claimed is:

1. An additive for preparing a weighted hardenable alkaline composition slurry for squeeze treatment of lost drilling fluid circulation in a subterranean thief zone which comprises from about 22.5 to about 50% by weight diatomaceous earth, from about 2 to about 30% by weight finely divided paper, from about 0.5 to about 30% by weight hydrophobic liquid, from about 9 to about 40% by weight micronized cellulose, and from about 9 to about 50% by weight lime, wherein the weight of the diatomaceous earth, finely divided paper, hydrophobic liquid, micronized cellulose and lime totals 100% wherein the additive is prepared by mixing together the finely divided paper with the hydrophobic liquid to adsorb the hydrophobic liquid on the finely divided paper, and thereafter mixing therewith the diatomaceous earth, the micronized cellulose, and the lime.

2. The additive of claim 1 wherein the composition comprises from about 24 to about 35% by weight diatomaceous earth, from about 3.5 to about 15.5% by weight finely divided paper, from about 0.9 to about 15.5% by weight hydrophobic liquid, from about 13.5 to about 35% by weight micronized cellulose fiber, and from about 22.5 to about 38% by weight lime, wherein the weight of the diatomaceous earth finely divided paper, hydrophobic liquid, micronized cellulose and lime totals 100%.

3. The additive of claim 1 wherein the composition comprises from about 24 to about 35% by weight diatomaceous earth, from about 4.5 to about 13% by weight finely divided paper, from about 1.25 to about 14% by weight hydrophobic liquid, from about 16 to about 30% by weight micronized cellulose, and from about 24 to about 35% by weight lime, wherein the weight of the diatomaceous earth, finely divided paper, hydrophobic liquid, micronized cellulose and lime totals 100%.

4. A weighted hardenable alkaline composition slurry comprising an aqueous liquid, a weight material, and from about 20 to about 100 pounds per 42 gallon barrel of the additive of claim 1.

5. A weighted hardenable alkaline composition slurry comprising an aqueous liquid, a weight material, and from about 20 to 100 pounds per 42 gallon barrel of the additive of claim 2.

6. A weighted hardenable alkaline composition slurry comprising an aqueous liquid, a weight material, and from about 20 to about 100 pounds per 42 gallon barrel of the additive of claim 3.

7. The additive of claim 1 wherein the diatomaceous earth contains sodium silicate and wherein the micronized cellulose contains a water soluble sulfate.

8. The additive of claim 2 wherein the diatomaceous earth contains sodium silicate and wherein the micronized cellulose contains a water soluble sulfate.

9. The additive of claim 3 wherein the diatomaceous earth contains sodium silicate and wherein the micronized cellulose contains a water soluble sulfate.

10. A method of preparing a hardenable alkaline composition which comprises mixing together finely divided paper with a hydrophobic liquid, and thereafter mixing therewith diatomaceous earth, a micronized cellulose, and lime wherein the composition comprises from about 22.5 to about 50% by weight diatomaceous earth, from about 2 to about 30% by weight finely divided paper, from about 0.5 to about 30% by weight hydrophobic liquid, from about 9 to about 40% by weight micronized cellulose, and from about 9 to about 50% by weight lime, wherein the weight of the diatomaceous earth, finely divided paper, hydrophobic liquid, micronized cellulose and lime totals 100%.

11. The method of claim 10 wherein the composition comprises from about 24 to about 35% by weight diatomaceous earth, from about 3.5 to about 15.5% by weight finely divided paper, from about 0.9 to about 15.5% by weight hydrophobic liquid, from about 13.5 to about 35% by weight micronized cellulose, and from about 22.5 to about 38% by weight lime, wherein the weight of the diatomaceous earth, finely divided paper, hydrophobic liquid, micronized cellulose and lime totals 100%.

12. The method of claim 10 wherein the composition comprises from about 24 to about 35% by weight diatomaceous earth, from about 4.5 to about 13% by weight finely divided paper, from about 1.25 to about 14% by weight hydrophobic liquid, from about 16 to about 30% by weight micronized cellulose, and from about 24 to about 35% by weight lime, wherein the weight of the diatomaceous earth, finely divided paper, hydrophobic liquid, micronized cellulose and lime totals 100%.

13. A method of decreasing the loss of fluid in a wellbore to a subterranean thief zone in which well drilling or servicing operations are being conducted which comprises introducing the weighted hardenable composition slurry of claim 4 into the thief zone by way of the wellbore and applying pressure to the slurry to decrease the water content of the slurry.

14. A method of decreasing the loss of fluid in a wellbore to a subterranean thief zone in which well drilling or servicing operations are being conducted which comprises introducing the weighted hardenable composition slurry of claim 5 into the thief zone by way of the wellbore and applying pressure to the slurry to decrease the water content of the slurry.

15. A method of decreasing the loss of fluid in a wellbore to a subterranean thief zone in which well drilling or servicing operations are being conducted which comprises introducing the weighted hardenable composition slurry of claim 6 into the thief zone by way of the wellbore and applying pressure to the slurry to decrease the water content of the slurry.

* * * * *